US008810413B2

(12) United States Patent
Wong et al.

(10) Patent No.: US 8,810,413 B2
(45) Date of Patent: Aug. 19, 2014

(54) USER FATIGUE (75) Inventors: Glenn A. Wong, Foster City, CA (US);
Peter C. Ellis, Cupertino, CA (US);
Mark C. Solomon, San Jose, CA (US);
Robert P. Bliven, Saratoga, CA (US)

(73) Assignee: Hewlett Packard Development Company, L.P., Houston, TX (US)

( * ) Notice: Subject to any disclaimer, the term of this patent is extended or adjusted under 35 U.S.C. 154(b) by 606 days.

(21) Appl. No.: 12/905,967

(22) Filed: Oct. 15, 2010

(65) Prior Publication Data

US 2012/0092172 A1    Apr. 19, 2012

(51) Int. Cl.
G08B 23/00 (2006.01)
G08B 21/06 (2006.01)
G06F 3/01 (2006.01)
G06F 3/03 (2006.01)

(52) U.S. Cl.
CPC ............... *G08B 21/06* (2013.01); *G06F 3/011* (2013.01); *G06F 3/0312* (2013.01)
USPC ..................... 340/575; 340/573.1; 340/573.7; 340/574; 345/10; 348/61; 348/77; 348/78; 348/169

(58) Field of Classification Search
None
See application file for complete search history.

(56) References Cited

U.S. PATENT DOCUMENTS

| 6,009,566 | A | * | 1/2000 | Hubbard ........................... 2/468 |
| 6,027,218 | A | * | 2/2000 | Kupniewski et al. ......... 359/871 |
| 6,483,485 | B1 | * | 11/2002 | Huang et al. .................... 345/10 |
| 7,027,621 | B1 | * | 4/2006 | Prokoski ....................... 382/118 |
| 7,646,394 | B1 | * | 1/2010 | Neely et al. .................... 345/633 |
| 7,733,480 | B2 | * | 6/2010 | Le Texier et al. ............. 356/247 |
| 7,741,957 | B2 | * | 6/2010 | Wang et al. ................ 340/309.7 |
| 7,893,935 | B1 | * | 2/2011 | Neely et al. .................... 345/419 |
| 8,009,878 | B2 | * | 8/2011 | Tsai ............................. 382/117 |
| 2008/0150889 | A1 | * | 6/2008 | Stern et al. .................... 345/156 |
| 2008/0276196 | A1 | * | 11/2008 | Tang ............................. 715/800 |
| 2010/0137748 | A1 | * | 6/2010 | Sone et al. .................... 600/595 |
| 2011/0261049 | A1 | * | 10/2011 | Cardno et al. ................ 345/419 |
| 2012/0075122 | A1 | * | 3/2012 | Whitlow et al. .............. 340/963 |
| 2012/0075483 | A1 | * | 3/2012 | Paoletti ....................... 348/207.1 |
| 2012/0154390 | A1 | * | 6/2012 | Narita et al. .................. 345/419 |
| 2014/0025397 | A1 | * | 1/2014 | Horseman ........................ 705/2 |

FOREIGN PATENT DOCUMENTS

WO    WO2008119106        10/2008
WO    WO 2008119106 A1 * 10/2008    ............... A47C 7/00

* cited by examiner

*Primary Examiner* — Julie Lieu
(74) *Attorney, Agent, or Firm* — Chun-Liang Kuo (57) ABSTRACT Detect a head position of a user viewing a display device with a sensor, determine a duration of the user viewing the display device, identify a user fatigue in response to the head position, and provide a response to the user with the display device based on the user fatigue and the duration of the user viewing the display device.

14 Claims, 7 Drawing Sheets

USER FATIGUE

BACKGROUND

When determining whether a user is fatigued, a device can utilize one or more sensors to detect a rate of blinking of the user's eyes. The device can compare the detected rate of blinking to a normal rate of blinking. If the detected rate of blinking is beyond or below the normal rate of blinking, the device can determine that the user fatigued. Additionally, the sensors can detect whether the user's eyes are gradually closing. If the sensor detects that the user's eyes are gradually closing, the device can also determine that the user is becoming fatigued.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

A sensor can be used to accurately detect a head position of a user viewing a display device. In response, a duration of the user viewing the display device can conveniently be determined and/or tracked. Based on the head position of the user, a user fatigue can be identified. Additionally, one or more responses can be provided to the user with the display device based on the user fatigue and the duration of the user viewing the display device. By providing one or more responses, a user friendly experience can be created for the user and a fatigue of the user can be remedied and/or reduced.

Figure 1:
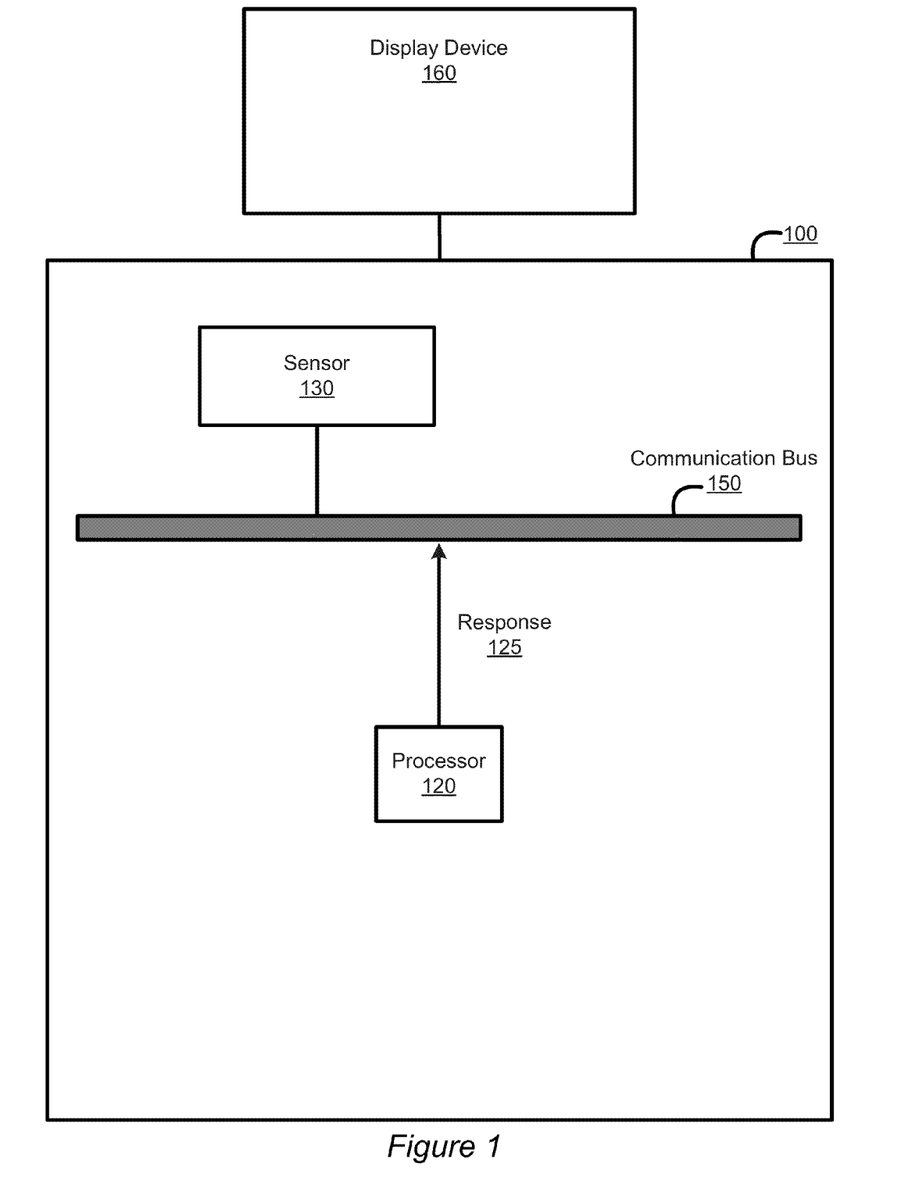
FIG. 1 illustrates a computing machine with a sensor according to an embodiment.

FIG. 1 illustrates a computing machine 100 with a sensor 130 according to an embodiment of the invention. In one embodiment, the computing machine 100 is or includes a desktop, a laptop, a notebook, a tablet, a netbook, an all-in-one system, a server, and/or the like. In another embodiment, the computing machine 100 is a cellular device, a PDA, an E-Reader, and/or any additional computing device which can include one or more sensors 130.

As illustrated in FIG. 1, the computing machine 100 is coupled to a display device 160 and includes a processor 120, a sensor 130, and a communication channel 150 for the computing machine 100 and/or one or more components of the computing machine 100 to communicate with one another. In one embodiment, the computing machine 100 additionally includes a storage application and a fatigue application stored on the storage device. In other embodiments, the computing machine 100 includes additional components and/or is coupled to additional components in addition to and/or in lieu of those noted above and illustrated in FIG. 1.

As noted above, the computing machine 100 includes a processor 120. The processor 120 can send data and/or instructions to the components of the computing machine 100, such as the sensor 130, the display device 160, and/or the fatigue application. Additionally, the processor 120 can receive data and/or instructions from components of the computing machine 100, such as the sensor 130, the display device 160, and/or the fatigue application.

The fatigue application is an application which can be utilized in conjunction with the processor 120 to detect and/or identify user fatigue of a user viewing the display device 160. When detecting user fatigue, a sensor 130 detects a head position of a user viewing the display device 160. For the purposes of this application, a user can be any person which can be detected by the sensor 130 to be viewing the display device 160. Additionally, a head position of a user corresponds to a location and/or an angle of the user's head in front of the display device 160 and/or the sensor 130.

The processor 120 and/or the fatigue application can additionally determine a duration of the user viewing the display device 160. In response to detecting the head position of the user, the processor 120 and/or the fatigue application can identify one or more user fatigues. For the purposes of this application, a user fatigue can include one or more strains or fatigues of the user's body. A user fatigue can include an eye strain, a neck strain, and/or a back strain. In other embodiments, a user fatigue can include additional strains and/or fatigues of the user in addition to and/or in lieu of those noted above.

In response to identifying a user fatigue, the processor 120 and/or fatigue application can provide one or more responses 125 to a user based on one or more of the identified user fatigues and/or the duration which the user is viewing the display device. For the purposes of this application, one or more responses 125 can include the processor 120 and/or the fatigue application adjusting at least one display setting of the display device 160, outputting one or more warning messages, and/or powering down the display device 160.

One or more of the warnings can include visual messages which can be displayed on the display device 160 or they can include audio messages which can be outputted using one or more audio devices coupled to the computing machine 100. In other embodiments, the processor 120 and/or the fatigue application can provide other additional actions in addition to and/or in lieu of those noted above when providing one or more responses 125.

The fatigue application can be firmware which is embedded onto the processor 120, the computing machine 100, and/or the storage device of the computing machine 100. In another embodiment, the fatigue application is an application stored on the computing machine 100 within ROM or on the storage device accessible by the computing machine 100. In other embodiments, the fatigue application is stored on a computer readable medium readable and accessible by the computing machine 100 or the storage device from a different location.

Additionally, in one embodiment, the storage device is included in the computing machine 100. In other embodiments, the storage device is not included in the computing machine 100, but is accessible to the computing machine 100 utilizing a network interface included in the computing machine 100. The network interface can be a wired or wireless network interface card. In other embodiments, the storage device can be configured to couple to one or more ports or interfaces on the computing machine 100 wirelessly or through a wired connection.

In a further embodiment, the fatigue application is stored and/or accessed through a server coupled through a local area network or a wide area network. The fatigue application communicates with devices and/or components coupled to the computing machine 100 physically or wirelessly through a communication bus 150 included in or attached to the computing machine 100. In one embodiment the communication bus 150 is a memory bus. In other embodiments, the communication bus 150 is a data bus.

As noted above, the processor 120 can be utilized in conjunction with the fatigue application to detect a user fatigue by using a sensor 130. The sensor 130 is a detection device configured to detect, receive, and/or capture information around the sensor 130 or the display device 160. The sensor 130 can be instructed, prompted and/or configured by the processor 120 and/or the fatigue application to detect a head position of a user viewing the display device 160.

Figure 2A:
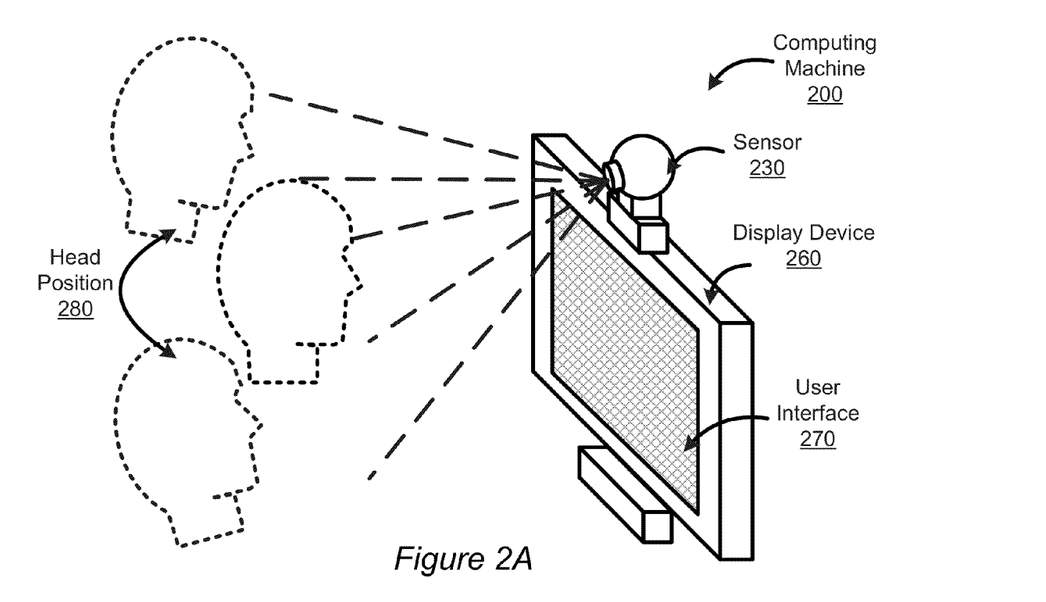
FIG. 2A illustrates a sensor detecting a user viewing a display device according to an embodiment.

FIG. 2A illustrates a sensor 230 detecting a user 205 viewing a display device 230 according to an embodiment of the invention. As illustrated in FIG. 2A, the sensor 230 can be coupled to one or more locations on or around a computing machine 200 or the display device 260. In other embodiments, the sensor 230 can be integrated as part of the computing machine 200 or the sensor 230 can be coupled to or integrated as part of one or more components of the computing machine 200, such as the display device 260.

As illustrated in the present embodiment, a sensor 230 can be an image capture device. The image capture device can be or include a 3D (three dimensional) depth image capture device. In one embodiment, the 3D depth image capture device can be or can include a time of flight device, a stereoscopic device, and/or a light sensor. In another embodiment, the sensor 230 includes at least one from the group consisting of a motion detection device, a proximity sensor, an infrared device, and/or a GPS. In other embodiments, a sensor 230 can include additional devices and/or components configured to detect, receive, and/or capture the user 205 viewing the display device 260.

The display device 260 can be an analog or a digital device configured to render, display, and/or project one or more pictures and/or moving videos. In one embodiment, the display device 260 can be a television, monitor, and/or a projection device. As shown in FIG. 2A, the display device 260 is configured by the processor and/or the fatigue application to render a user interface 270 for the user 205 to view.

The user interface 270 can display one or more objects, menus, images, videos, and/or maps for the user 205 to view. In one embodiment, the user interface 270 can be configured to render one or more messages and/or warnings. In another embodiment, the display device 260 includes or is coupled to one or more audio devices configured to output a warning message. In other embodiments, the display device 260 includes one or more display settings which can be modified by the processor and/or the fatigue application. One or more settings can include a power setting, a brightness setting, a contrast setting, a color setting, a resolution setting, and/or a scaling setting.

A processor and/or a fatigue application of the computing machine 200 can send instructions to the sensor 230 to detect the user 205 viewing the display device 260. In one embodiment, the sensor 230, the processor, and/or the fatigue application can use facial detection technology and/or eye detection technology to determine whether the user is facing or viewing the display device 260. As illustrated in FIG. 2, sensor 230 has detected the eyes or face of the user. As a result, the processor and/or the fatigue application determine that the user 205 is viewing the display device 260. In response, the sensor 230 can proceed to detect a head position 280 of the user 205.

As noted above, the head position 280 corresponds to a location and/or an angle of the user's 205 head in front of the display device 260 and/or the sensor 230. In one embodiment, when detecting the head position 280 of the user 205, the sensor 230 can determine whether a line of sight of the user 205 is aligned with the display device 260. For the purposes of this application, the line of sight of the user 205 corresponds to where the user 205 is looking. When determining whether the line of sight of the user 205 is aligned, the sensor 230, the processor, and/or the fatigue application can use eye detection or eye tracking technology to determine where the user 205 is looking.

In one embodiment, the line of sight of the user 205 is determined by the processor and/or the fatigue application to be aligned with the display device 260 if the user's 205 eyes are viewing or are aligned with a top portion of the display device 260. In response, the head position 280 of the user 205 can be in a neutral position. If the user's 205 eyes are angled up to view the top portion of the display device 260, the location of the user's 205 head can be below the top portion of the display device 260 and line of sight of the user 205 can be angled up at an inclined position. As a result, the processor and/or the fatigue application determine that the line of sight of the user 205 is not aligned with the display device 260 and the head position 280 of the user 205 is inclined.

If the user's 205 eyes are angled down to view the top portion of the display device 260, the head position 280 of the user 205 can be at a location above the top portion of the display device 260 and the line of sight of the user 205 is angled down. As a result, the processor and/or the fatigue application can determine that the line of sight of the user 205 is not aligned with the display device 260 and the head position 280 of the user 205 is declined.

In other embodiments, other reference points, other than the top portion of the display device 260 can be used to determine whether the line of sight of the user 205 is aligned with the display device 260. Other reference points can include a center of the display device 260 and/or a bottom of the display device 260. Other reference points can be used if the user 205 is reclined at one or more angles or if the user 205 is wearing lenses. In other embodiments, other reference points can be used in response to an age of the user.

As noted above, the processor and/or the fatigue application can additionally determine a duration of time which the user 205 is viewing the display device 260. In one embodiment, the processor and/or the fatigue application can use the eye detection technology and/or facial detection technology in conjunction with the sensor 230 to measure an amount of time which the user 205 is viewing the display device 260. The processor and/or the fatigue application can continuously or periodically make time stamps for when the user 205 is initially detected by the sensor 230 to be viewing the display device 260 and while the user 205 continues to view the display device 260.

In one embodiment, the processor, the fatigue application, and/or the sensor 230 can further detect an amount of movement of the user's 205 head. The processor, the fatigue application, and/or the sensor 230 can track the head position 280 of the user 205 while the user 205 continues to view the display device 260 and make note of any changes to the head position 280.

Figure 2B:
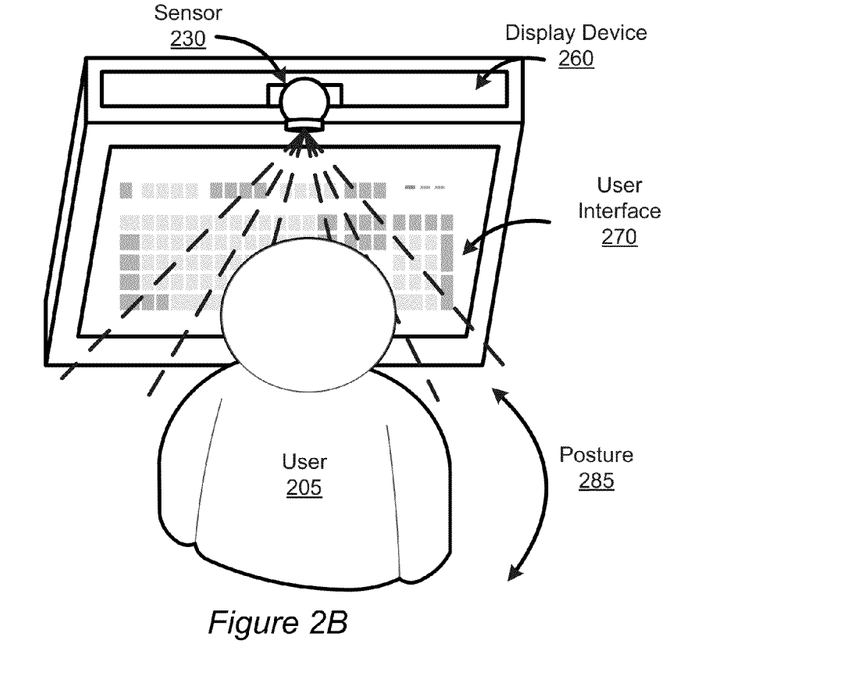
FIG. 2B illustrates a sensor detecting a user viewing a display device according to an embodiment.

FIG. 2B illustrates a sensor 230 detecting a user 205 viewing a display device 260 according to another embodiment of the invention. As noted above, the sensor 230 can detect a posture 285 of the user 205 when the user 205 is viewing the display device 260. The posture 285 of the user 205 corresponds to a position of one or more areas of the user's 205 body. One or more areas can include a chest of the user 205 and/or a shoulder of the user 205.

When detecting a posture 285 of the user 205, the sensor 230 can determine whether the user's 205 shoulders and/or chest are bent forward. In one embodiment, the sensor 230 can detect a distance of the user's 205 chest and/or shoulders from the display device 260 and the distance can be compared to a predefined distance. The predefined distance can represent a distance from the sensor 230 and/or the display device 260 where the user's 205 chest and/or shoulder would be upright and not be bent forwarded. The predefined distance can be defined by the user 205, the processor, the fatigue application, and/or a manufacturer.

If the distance of the user's 205 chest and/or shoulders is equal to or within a threshold of the predefined distance, the processor and/or the fatigue application can determine that the posture 285 of the user 205 is good. If the distance of the user's 205 chest and/or shoulders is less than the predefined distance and outside the threshold, the processor and/or the fatigue application can determine that the posture 285 of the user 205 is bad. When a posture of the user 205 is bad, one or more areas of the user's 205 body can be slouched or bent forward, which can lead to a back strain of the user 205. In other embodiments, if the user 205 is in a reclined position, the predefined distance can be modified by the user 205, the processor, and/or the fatigue application to compensate for the reclined position.

Similar to above, the sensor 230, the processor, and/or the fatigue application can detect an amount of movement of one or more areas of the user's 205 body and/or determine a duration which the user's 205 posture 285 continues to be bad. In one embodiment, the processor and/or the fatigue application can also consider a position of the user's 205 neck when detecting a posture 285 of the user. When detecting a position of the user's 205 neck, the processor and/or the fatigue application can utilized a head position of the user 205. If the head position 280 of the user 205 is inclined or declined, then the processor and/or the fatigue application will determine that the neck of the user 205 is bent forward or bent back. As a result, the processor and/or the fatigue application will determine that the posture 285 of the user 205 is bad.

In one embodiment, the sensor 230 further detects an amount of ambient light around the sensor 230 and/or the display device 260. The processor and/or the fatigue application can compare the detected amount of ambient light to a predefined light value. If the amount of ambient light is less than the predefined light value, the processor and/or the fatigue application can determine that the amount of ambient light for the user 205 is insufficient. In another embodiment, if the amount of ambient light is greater than the predefined light value, the processor and/or the fatigue application can determine that there is too much ambient light. In response to detecting a head position of the user 205, a posture of the user 205, and/or an amount of ambient light around the sensor 230 and/or the display device 260, the processor and/or the fatigue application can identify one or more user fatigues of the user 205. As noted above, a user 205 fatigue can include an eye strain, a neck strain, and/or a back strain.

Figure 3:
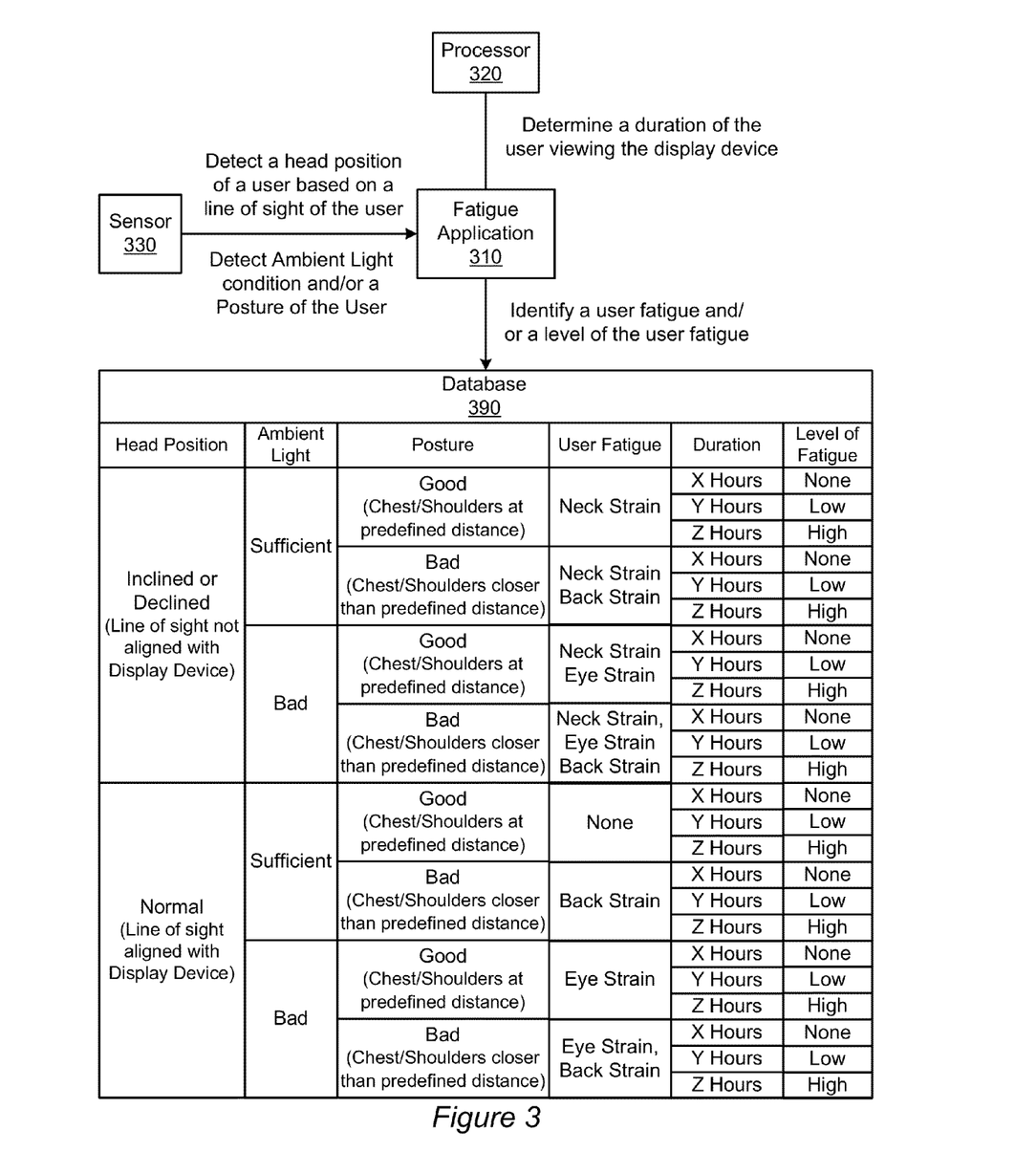
FIG. 3 illustrates a block diagram of a fatigue application identifying a user fatigue according to an embodiment.

FIG. 3 illustrates a block diagram of a fatigue application 310 identifying a user fatigue according to an embodiment of the invention. As noted above, a processor 320 and/or the fatigue application 310 can identify a user fatigue in response to a sensor 330 detecting a head position of the user, a posture of the user, and/or an amount of ambient light around a sensor 330 and/or a display device. As shown in the present embodiment, sensor 330 has detected a head position of a user viewing a display device. Additionally, the sensor 330 has detected am amount of ambient light and/or a posture of the user.

In response, the processor 320 and/or the fatigue application 310 proceed to identify a user fatigue associated with the detected information. In one embodiment, when identifying a user fatigue, the processor 320 and/or the fatigue application 310 can access a database 390. The database 390 includes a list of one or more user fatigues recognized by the processor 320 and/or the fatigue application 310. In one embodiment, the database 390 can be stored on the computing machine. In another embodiment, the database 390 can be stored on additional locations accessible to the processor 320 and/or the fatigue application 310 in addition to and/or in lieu of those noted above and illustrated in FIG. 3.

As illustrated in FIG. 3, the database 390 can list one or more user fatigues, such as an eye strain of the user, a neck strain of the user, and/or a back strain of the user. Further, the database 390 can list a corresponding head position, an ambient light condition, and/or a posture condition associated with one or more of the user fatigues. As shown in FIG. 3, an inclined or declined head position of the user can correspond to a neck strain. As noted above, the head position of the user is inclined or declined when the line of sight of the user is angled and/or not aligned with the display device.

Additionally, as illustrated in FIG. 3, a bad or insufficient amount of ambient light can correspond to an eye strain. As noted above, the processor 320 and/or the fatigue application 310 can compare an amount of detected ambient light to a predefined light value when determining whether the amount of ambient light is insufficient. Further, a bad posture or poor posture of the user can correspond to a back strain. As noted above and as illustrated in FIG. 3, a posture of the user is bad or poor if a chest and/or shoulders of the user are closer to the sensor 330 and/or the display device than a predefined distance. In other embodiments, a user fatigue can include additional strains or fatigues and can correspond to additional conditions in addition to and/or in lieu of those noted above.

As illustrated in FIG. 3, the processor 320 and/or the fatigue application 310 can also determine a duration which the user is viewing the display device. In one embodiment, the processor 320 and/or the fatigue application 310 can utilize the viewing time to identify a duration of a user fatigue. As noted above, when determining a duration which the user is viewing the display device, the processor 320, the fatigue application 310, and/or the sensor 330 can use eye detection technology and/or facial detection technology to determine whether the user is viewing the display device. In one embodiment, the processor 320 and/or the fatigue application 310 can mark an initial time which the user is detected to be viewing the display device. The processor 320, the fatigue application 310, and/or the sensor 330 can then continue to track the time as the user continues to view the display device.

In response to identifying the viewing time, the processor 320 and/or the fatigue application 310 can identify a level of fatigue of the user. In one embodiment, the level of user fatigue can be none, low, or high. As the duration which the user is viewing the display device is increased from X, to Y, and to Z, the level of fatigue correspondingly increases from none, to low, and to high. In other embodiments, the level of the user fatigue can further be based off the amount of head movement or body movement of the user. Utilizing an identified user fatigue and a level of the user fatigue (duration which the user is viewing the display device), the processor 320 and/or the fatigue application 310 can proceed to provide one or more responses to the user with a display device.

Figure 4:
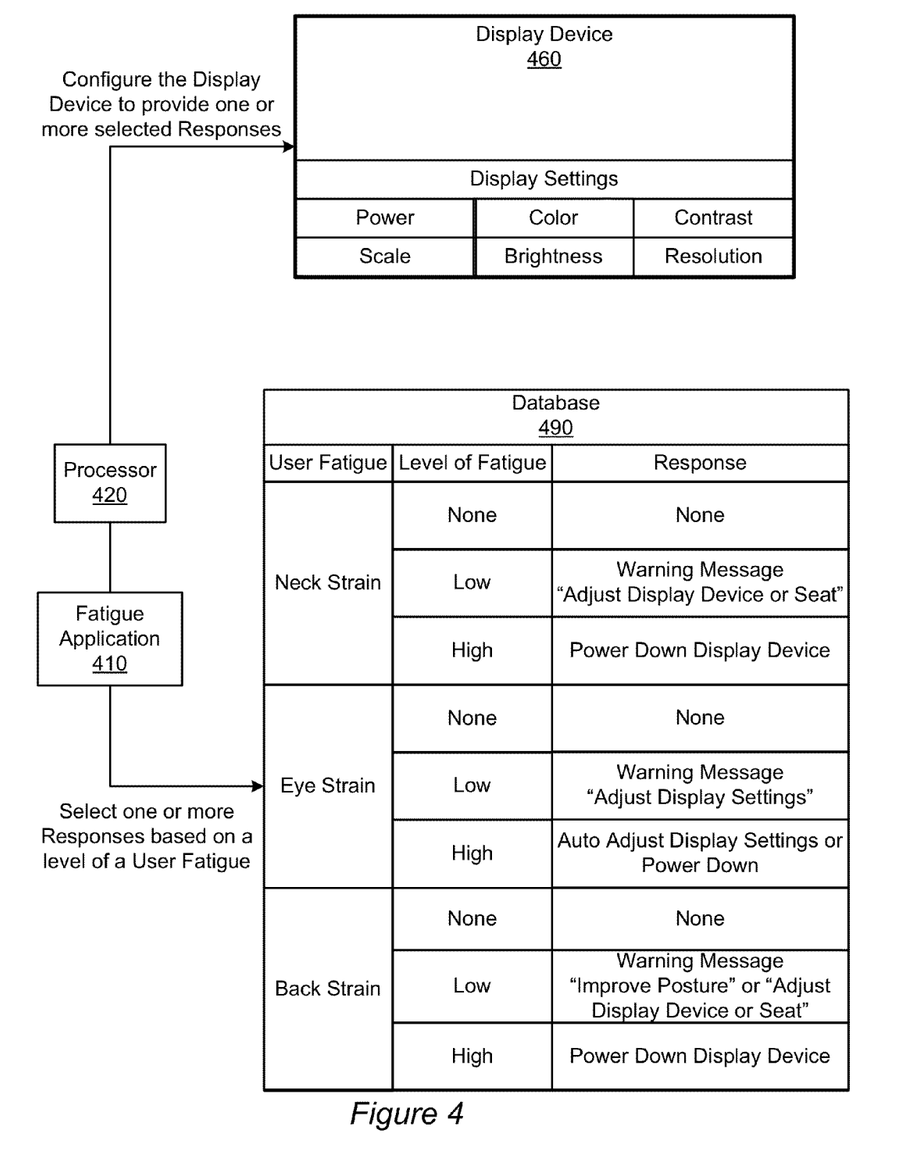
FIG. 4 illustrates a block diagram of a fatigue application providing a response based on a user fatigue according to an embodiment.

FIG. 4 illustrates a block diagram of a fatigue application 410 providing a response based on a user fatigue according to an embodiment of the invention. In one embodiment, a database 490 can list one or more responses which the processor 420 and/or the fatigue application 410 can provide. The processor 420 and/or the fatigue application 410 can access the database 490 to select one or more of the responses to provide. As noted above and as illustrated in FIG. 4, one or more of the responses can correspond to a user fatigue and a level of the user fatigue.

The processor 420 and/or the fatigue application 410 can use a previously identified user fatigue and a previously identified level of the user fatigue to determine which of the corresponding responses to select. Once the processor 420 and/or the fatigue application 410 have identified and selected a corresponding response, the processor 420 and/or the fatigue application 410 can access the display device 460 and configure the display device 360 to provide one or more of the selected responses.

As noted above, one or more responses can include adjusting one or more settings of a display device 460 and/or rendering one or more messages for display. As shown in the present embodiment, one or more display settings can include a power setting, a scaling setting, a color setting, a brightness setting, a contrast setting, and/or a resolution setting. In other embodiments, one or more display settings can include additional settings in addition to and/or in lieu of those noted above and illustrated in FIG. 4.

The processor 420 and/or the fatigue application 410 can automatically adjust one or more of the display settings based on the previously detected and identified information of the head position of the user, the posture of the user, the ambient light condition around a sensor or the display device 430, and/or the level of the user fatigue. In one embodiment, as illustrated in FIG. 4, if the level of the user fatigue is high, the processor 420 and/or the fatigue application 410 can automatically adjust one or more of the display settings without a prompt. Automatically adjusting one or more of the display settings can include powering down the display device.

In another embodiment, one or more messages can be used to provide one or more responses. As noted above, one or more of the messages can be displayed on the display device 460 or outputted through an audio device coupled to the computing machine and/or the display device 460. The user can be prompted through one or more messages to manually adjust one or more of the display settings or adjust a viewing position or sitting position. As illustrated in FIG. 4, if the user fatigue included an eye strain and the level of fatigue is low, the processor 420 and/or the fatigue application 410 can instruct the display device 460 to render a warning message prompting the user to adjust one or more of the display settings, such as a brightness setting and/or a scaling setting.

In one embodiment, the display device 460 can further include one or more motors and the processor 420 and/or the fatigue application 410 can automatically a select and provide a response by positioning or angling of the display device 460 in response to the user fatigue and/or the level of the user fatigue. In other embodiments, additional responses can be provided by the processor 420 and/or the fatigue application 410 in addition to and/or in lieu of those noted above and illustrated in FIG. 4. In response to providing one or more responses, a user viewing experience of the display device 460 can be adjusted to compensate for a user fatigue and/or a level of the user fatigue.

Figure 5:
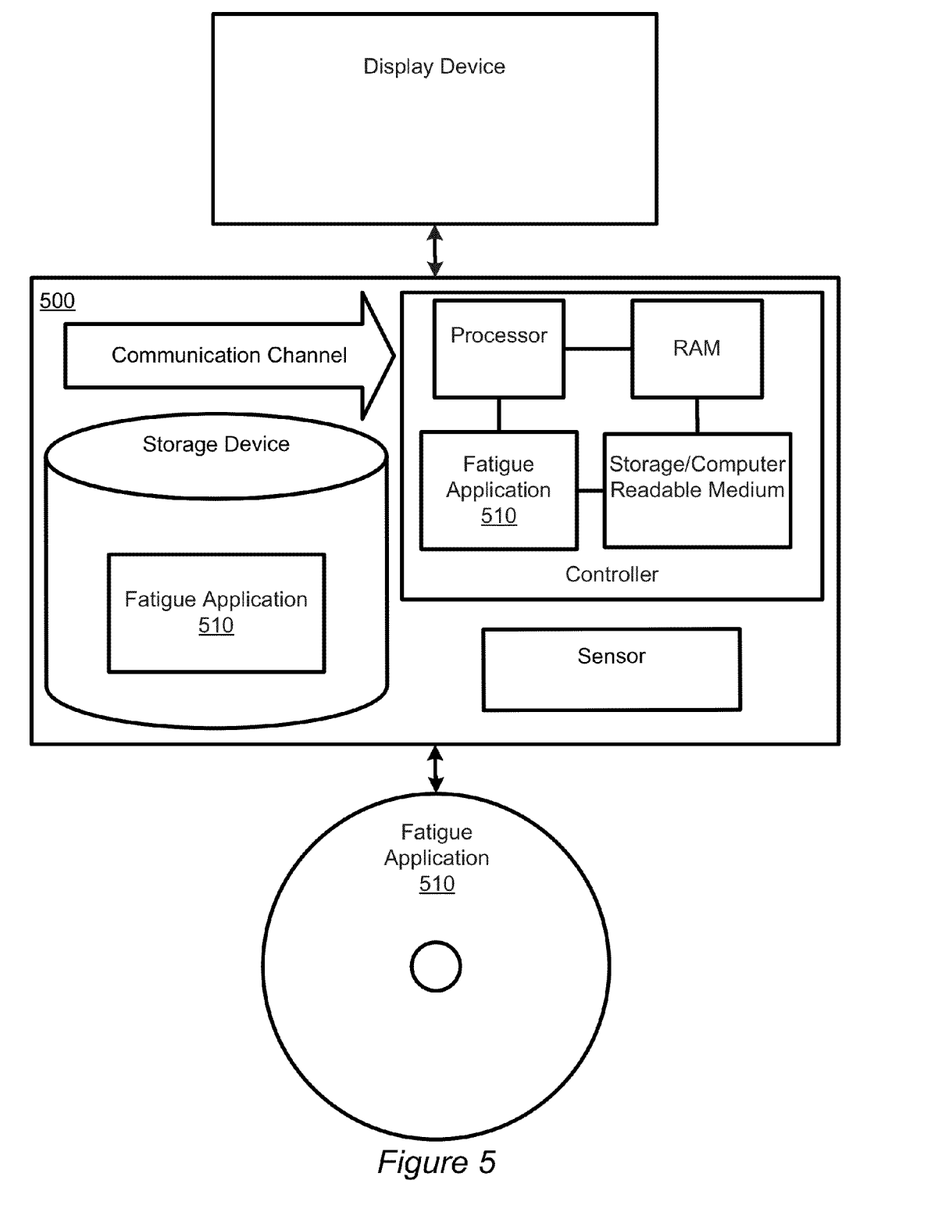
FIG. 5 illustrates a fatigue application on a computing machine and a fatigue application stored on a removable medium being accessed by the computing machine according to an embodiment.

FIG. 5 illustrates a computing machine 100 with a fatigue application 510 and a fatigue application 510 stored on a removable medium being accessed by the computing machine 500 according to an embodiment of the invention. For the purposes of this description, a removable medium is any tangible apparatus that contains, stores, communicates, or transports the application for use by or in connection with the computing machine 500. As noted above, in one embodiment, the fatigue application 510 is firmware that is embedded into one or more components of the computing machine 500 as ROM. In other embodiments, the fatigue application 510 is an application which is stored and accessed from a hard drive, a compact disc, a flash disk, a network drive or any other form of computer readable medium that is coupled to the computing machine 500.

Figure 6:
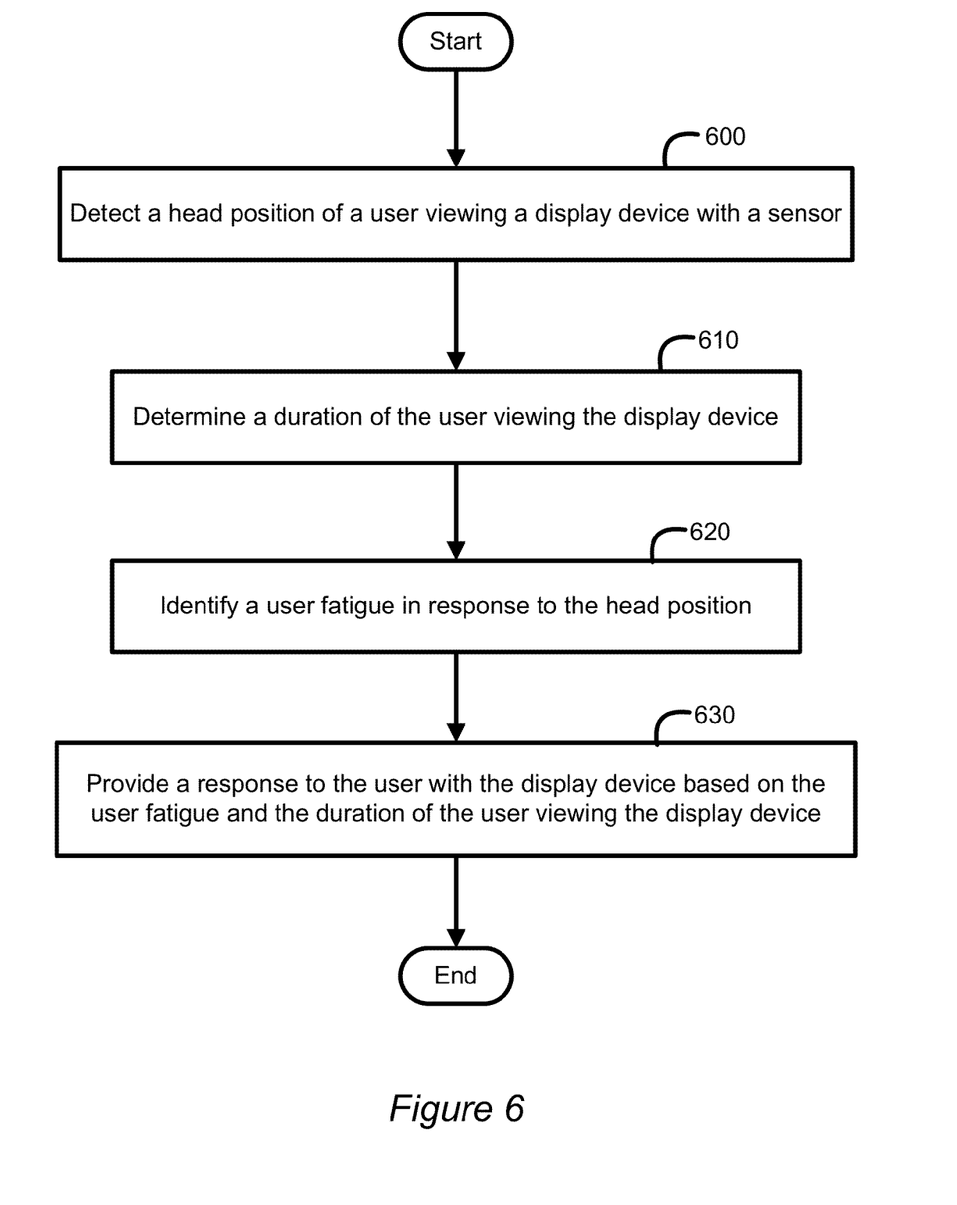
FIG. 6 is a flow chart illustrating a method to detect user fatigue according to an embodiment.

FIG. 6 is a flow chart illustrating a method for detecting an input according to an embodiment of the invention. The method of FIG. 6 uses a computing machine with a processor, a sensor, a communication channel, a storage device, and/or a fatigue application. In other embodiments, the method of FIG. 6 uses additional components and/or devices in addition to and/or in lieu of those noted above and illustrated in FIGS. 1, 2, 3, 4, and 5.

As noted above, the response application is an application which can independently or in conjunction with the processor to detect and/or identify a user fatigue. When detecting and/or identifying a user fatigue, a sensor can detect a head position of a user viewing a display device 600. The processor, the fatigue application, and/or the sensor can initially use facial detection or eye detection technology to determine whether the user is viewing the display device.

If the user is determined to be viewing the display device, the processor, the fatigue application, and/or the sensor can proceed to determine whether a line of sight of the user is aligned with the display device. As noted above, the line of sight corresponds to where the user is looking at and the top portion of the display device can be used as a reference point. If the users eyes are not angled up or down when viewing the top portion of the display device, the processor and/or fatigue application can determine that the head position of the user is neutral. In another embodiment, if the user's eyes are angled up or down when viewing the top portion of the display device, the line of the sight of the user can not be aligned with the display device and the head position of the user can be inclined or declined.

In one embodiment, the processor and/or the fatigue application can additionally utilize the sensor to detect a posture of the user. As noted above, the posture of the user corresponds to a position of one or more areas of the user, such as a chest area or a shoulder area of the user. The sensor can detect a distance of the chest and/or shoulders and compare the distance to a predefined distance to determine whether the user is leaning forward or slouching. If the user is leaning forward or slouching, the processor and/or the fatigue application will determine that the posture of the user is bad.

In other embodiments, the processor and/or the fatigue application can use the sensor to detect an amount of ambient light around the sensor and/or the display device. The processor and/or the fatigue application can compare the detected value to a predefined light level to determine whether an amount of ambient light is insufficient.

As noted above, the processor and/or the fatigue application can additionally determine a duration which the user is viewing the display device 610. The processor and/or the fatigue application can mark an initial time which the user is detected by the sensor to be viewing the display device and continue to update the time as the user continues to view the display device.

In response to detecting a head position of the user, a posture of the user, an amount of ambient light, and/or a duration which the user is viewing the display device, the processor and/or the fatigue application can identify a user fatigue 620. As noted above, a user fatigue can include a neck strain of the user, a back strain of the user, and/or an eye strain of the user. The processor and/or the display device can determine whether the user fatigue is or includes any of the above by accessing a database.

As noted above, the database can list one or more user fatigues and corresponding conditions (head position condition, posture condition, and/or ambient light condition) of the user fatigue. In one embodiment, once the processor and/or the fatigue application have identified one or more user fatigues of the user, a level of the user fatigue can be identified. When identifying the level of the user fatigue, the processor and/or the fatigue application can use the amount of time which the user is viewing the display device as a reference. As the amount of time which the user is detected to be viewing the display device increases, the level of the user fatigue can correspondingly increase.

Once the processor and/or the fatigue application have identified a user fatigue and corresponding level of the user fatigue, one or more responses can be selected for the processor and/or the fatigue application to provide through the display device 630. As noted above, one or more responses can include adjusting one or more display settings and/or outputting one or more messages. In one embodiment, adjusting one or more display settings can include powering down the display device. In other embodiments, one or more responses can be to automatically adjusting a viewing angle or position of the display device. The method is then complete or the sensor can continue to detect a head position of the user, a posture of the user, and/or an ambient light condition. In other embodiments, the method of FIG. 6 includes additional steps in addition to and/or in lieu of those depicted in FIG. 6.

Figure 7:
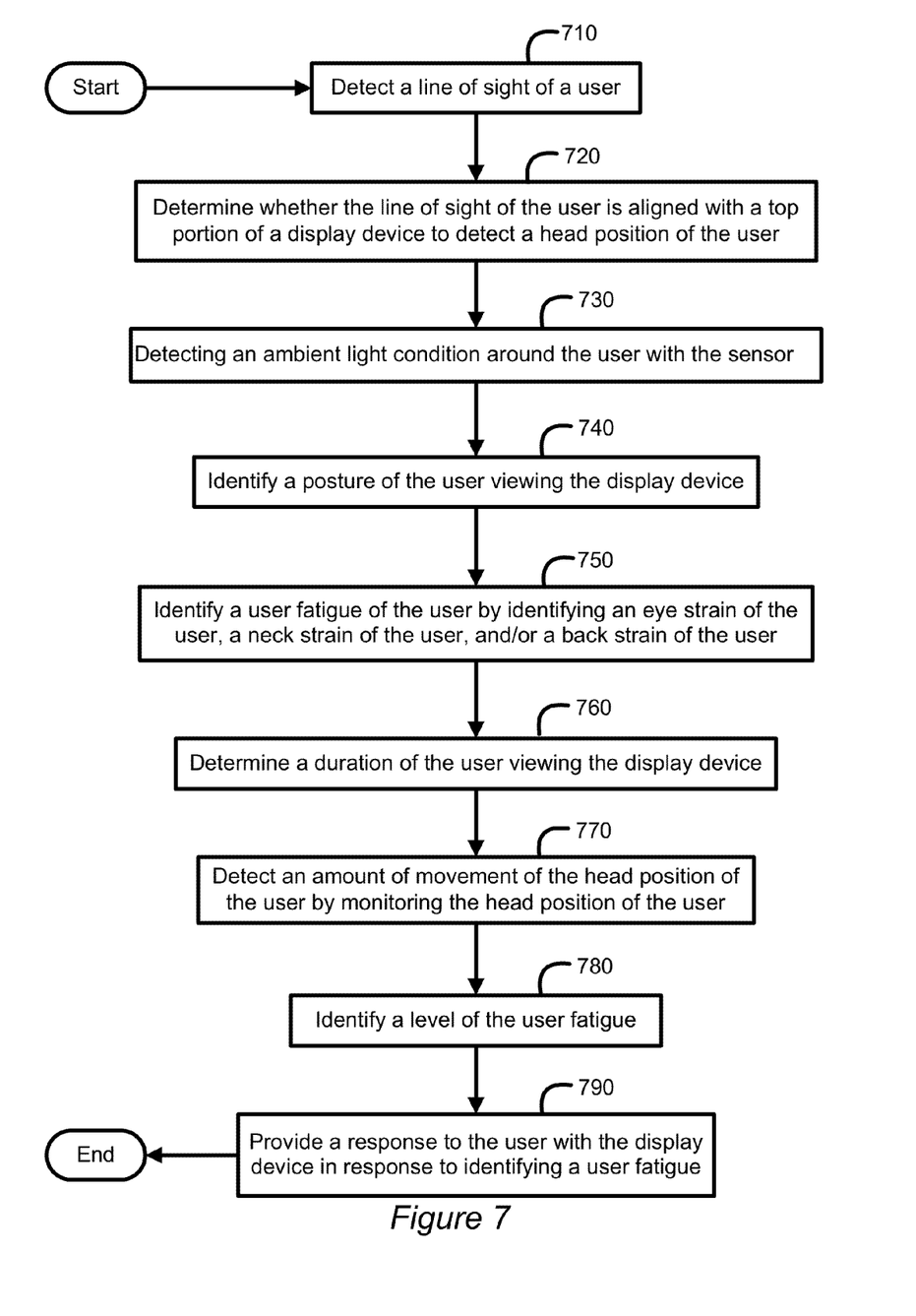
FIG. 7 is a flow chart illustrating a method to detect user fatigue according to another embodiment.

FIG. 7 is a flow chart illustrating a method for detecting an input according to another embodiment of the invention. Similar to the method disclosed above, the method of FIG. 7 uses a computing machine with a processor, a sensor, a communication channel, a storage device, and/or a fatigue application. In other embodiments, the method of FIG. 7 uses additional components and/or devices in addition to and/or in lieu of those noted above and illustrated in FIGS. 1, 2, 3, 4, and 5.

As noted above, the processor and/or the fatigue application can initially detect a line of sight of the user 710. The sensor can detect a line of sight of the user by using eye tracking technology to determine where the user is looking. In one embodiment, the processor and/or the fatigue application can determine that a line of sight of the user is aligned with the display device if the eyes of the user are aligned with a top portion of the display device. In another embodiment, if the user's eyes are angled up or angled down when viewing the top portion of the display device, the processor and/or the fatigue application will determine that line of sight of the user is not aligned with the display device.

In response to determining whether the line of sight of the user is aligned with a top portion of the display device, the processor and/or the fatigue application can detect a head position of the user 720. If the line of sight was previously determined to be aligned with the top portion of the display device, the processor and/or the fatigue application can determine that the head position is neutral. In another embodiment, if the line of sigh was angled up or angled down, the processor and/or the fatigue application can determine that the head position of the user is inclined or declined. In other embodiments, the reference point used by the sensor can be the center of the display device and/or a bottom of the display device. The reference point can be modified in response to an age of the user and/or in response to the user wearing glasses.

As noted above, the sensor can additionally be used to detect an ambient light condition around the sensor and/or the display device 730. The sensor can detect an amount of light around the sensor and/or the display device and the processor and/or the fatigue application can compare the amount of detected light to a predefined light value. If the amount of ambient light is below the predefined light value, the ambient light condition will be determined to be insufficient.

In one embodiment, the sensor additionally detects a posture of the user viewing display device 740. As noted above, when detecting the posture of the user, the sensor can detect a distance of the user's chest and/or shoulders from the sensor and/or the display device. The processor and/or the fatigue application can then compare the detected distance to a predefined distance to determine whether the user is slouching or leaning forward. If the user is slouching or leaning forward, the user can be determined to have bad posture. As noted above, the predefined value can be modified by the user, the processor, and/or the fatigue in response to the user being in a reclined position.

In response to detecting a head position of the user, an ambient light condition, and/or a posture of the user, the processor and/or the fatigue application can determine whether a user fatigue includes an eye strain, a neck strain, and/or a back strain 750. As noted above, the processor and/or the fatigue application can access a database, which lists user fatigues and corresponding conditions for the user fatigues. The processor can use the previously detected results from the sensor to determine which user fatigue a user may have.

Additionally, as noted above, the processor and/or the fatigue application can determine a duration which the user is viewing the display device by marking an initial time which the sensor first detects the user to be viewing the display device and continuing to update the time as the user continues to view the display device 760. In one embodiment, processor and/or the fatigue application utilize the sensor to detect an amount of movement of the head position and/or posture of the user 770.

In response to the viewing time of the user and/or the amount of movement of the head position and/or posture of the user, the processor and/or the fatigue application can proceed to identify a level of the user fatigue 780. Using the identified user fatigue and/or the level of the user fatigue, the processor and/or the fatigue application can provide one or more responses to the user with the display device 790.

As noted above, one or more responses can include modifying one or more display settings on the display device and/or outputting one or more messages to the user. Further a display setting can be automatically adjusted or the user can be prompted to adjust the display setting. The method is then complete. In other embodiments, the method of FIG. 7 includes additional steps in addition to and/or in lieu of those depicted in FIG. 7.

What is claimed is:

1. A method to detect user fatigue comprising:
    detecting a head position of a user viewing a display device and detecting an amount of movement of the head position of the user with a sensor;
    determining a posture of the user with the sensor by detecting a distance between at least one of a chest or shoulders of the user and the display device, and comparing the distance with a predetermined distance;
    detecting an ambient light condition around the user with the sensor;
    determining a duration of the user viewing the display device;
    identifying a user fatigue in response to the head position, the posture of the user, and the ambient light condition, wherein the fatigue includes at least one from the group comprising of an eye strain of the user, a neck strain of the user, and a back strain of the user;
    identifying a level of the user fatigue based on at least the amount of movement of the head position; and
    providing a response to the user with the display device based on the level of the user fatigue.

2. The method of claim 1 wherein identifying an eye strain includes detecting the ambient light condition around the user with the sensor.

3. The method of claim 1 wherein a neck strain of the user is identified in response to detecting the head position of the user in at least one from the group consisting of an inclined position and a declined position.

4. The method of claim 3 wherein the head position of the user is in at least one from the group consisting of an inclined position and a declined position if a line of sight of the user is not aligned with a top portion of the display device.

5. The method of claim 1 wherein providing the response to the user includes at least one from the group consisting of adjusting at least one setting of the display device, displaying a warning message, and powering down the display device.

6. A computing machine comprising:
    a display device;
    a sensor to detect a head position of a user if the user is viewing the display device, a posture of the user, an ambient light condition around the user, and an amount of movement of the head position of the user, wherein the posture of the user is detected by calculating a distance between at least one of a chest or shoulders the user and the display device and comparing the distance with a predetermined distance; and
    a processor to
        identify a duration of the user viewing the display device if the user is viewing the display device,
        identify a user fatigue in response to the head position, the posture of the user, and the ambient light condition, wherein the fatigue includes at least one from the group comprising of an eye strain of the user, a neck strain of the user, and a back strain of the user;
        identify a level of the user fatigue based on at least the amount of movement of the head position, and
        provide at least one response to the user in response to identifying a user fatigue based on the level of the user fatigue.

7. The computing machine of claim 6 further comprising a database which lists at least one user fatigue.

8. The computing machine of claim 7 wherein the database lists a corresponding head position and a corresponding duration of a viewing time associated with at least one of the user fatigues.

9. The computing machine of claim 6 wherein the display device renders a user interface for the user to interact with.

10. The computing machine of claim 6 wherein the display device includes at least one setting which the processor can modify when providing a response.

11. The computing machine of claim 10 where at least one of the settings include a power setting, a brightness setting, a contrast setting, a color setting, a resolution setting, and a scale setting.

12. The computing machine of claim 6 wherein the sensor includes at least one from the group consisting or an image capture device, an infrared device, a proximity device, and a stereoscopic device.

13. A computer readable medium comprising instructions that if executed cause a processor to:
    determine a head position of a user viewing a display device and detect an amount of movement of the head position of the user with a sensor;
    determine a posture of the user by detecting a distance between at least one of a chest or shoulders of the user and the display device, and compare the distance with a predetermined distance;
    detecting an ambient light condition around the user;
    determine a duration of the user viewing the display device;
    identify a user fatigue in response to the head position, the posture of the user, and the ambient light condition, wherein the fatigue includes at least one from the group comprising of an eye strain of the user, a neck strain of the user, and a back strain of the user;
    identify a level of the user fatigue based on at least the amount of movement of the head position; and
    provide a response to the user through the display device in response to identifying a user fatigue based on the level of the user fatigue.

14. The computer-readable program in a computer-readable medium of claim 13 wherein the processor uses at least one from the group consisting of facial detection technology and eye detection technology when determining the duration which the user is viewing the display device.

* * * * *